May 29, 1962
C. A. RIETZ
3,036,921
METHOD OF PROCESSING FOODSTUFFS
Filed April 5, 1960
3 Sheets-Sheet 1
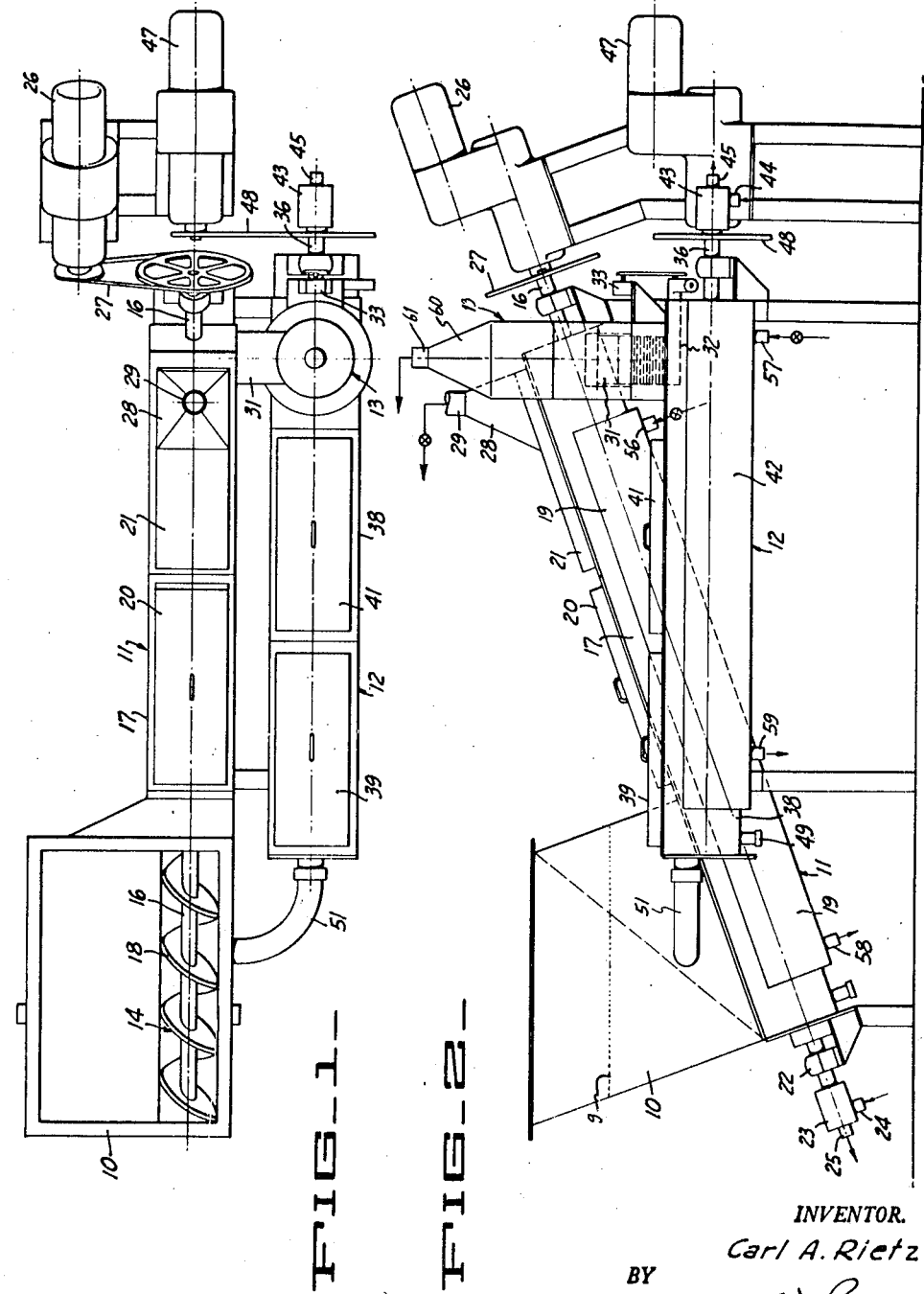
INVENTOR.
Carl A. Rietz
BY
ATTORNEYS

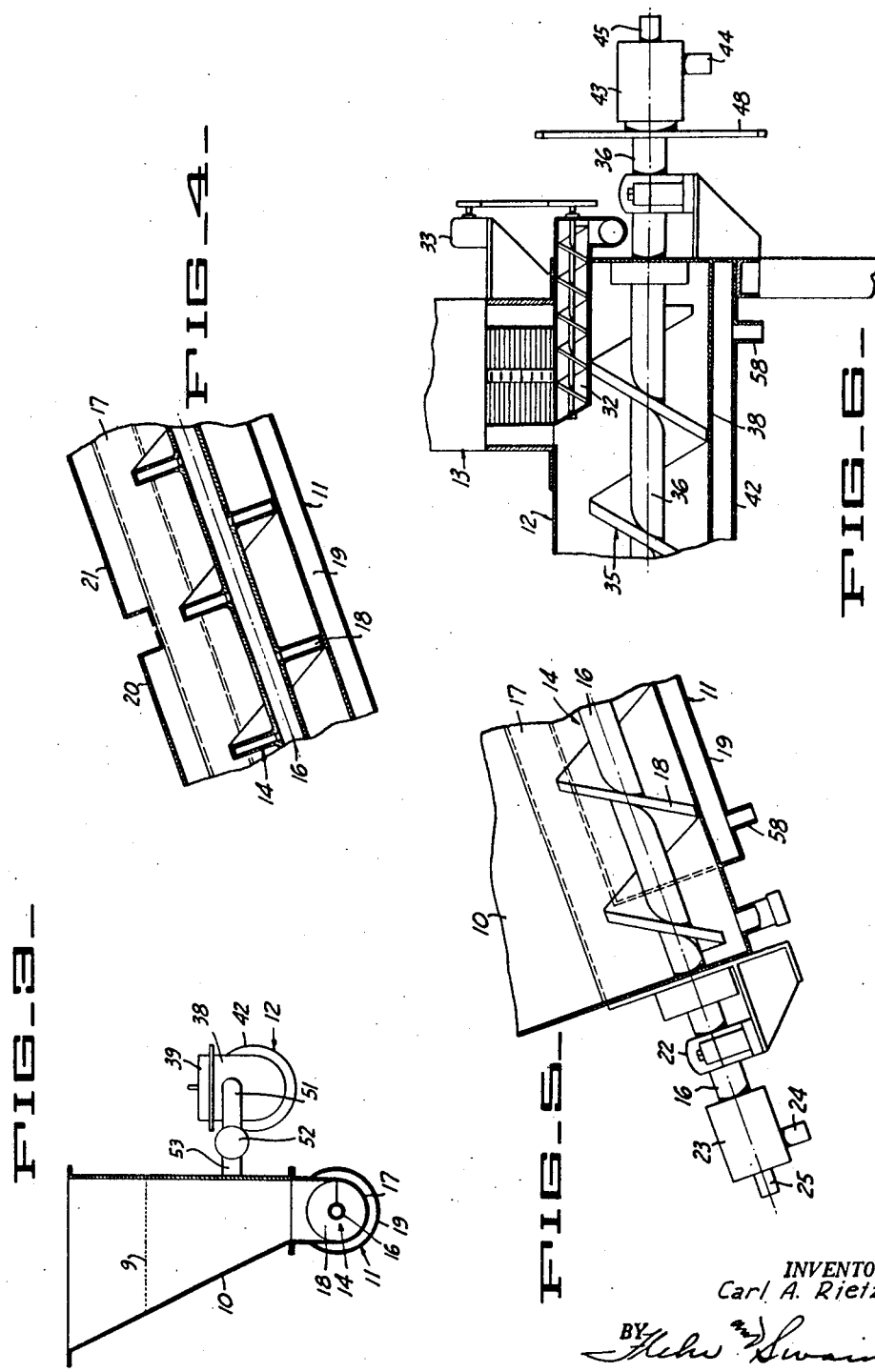

May 29, 1962 C. A. RIETZ 3,036,921
METHOD OF PROCESSING FOODSTUFFS
Filed April 5, 1960 3 Sheets-Sheet 3
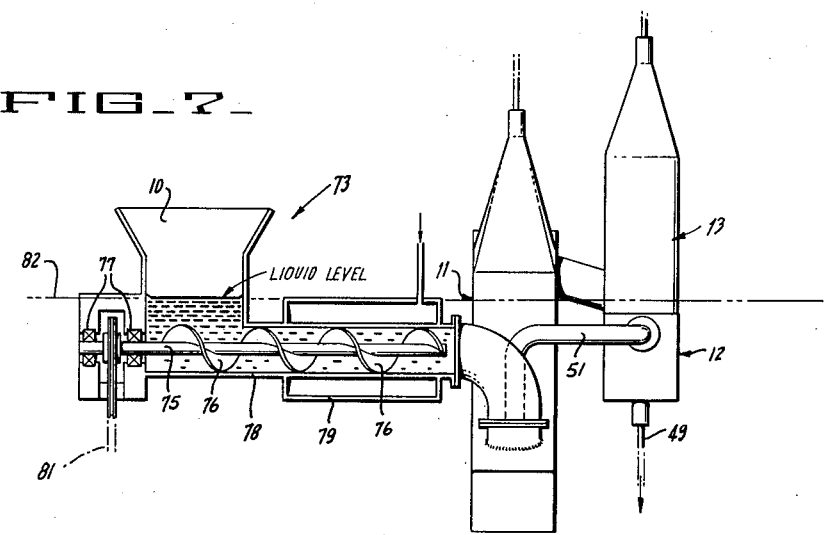
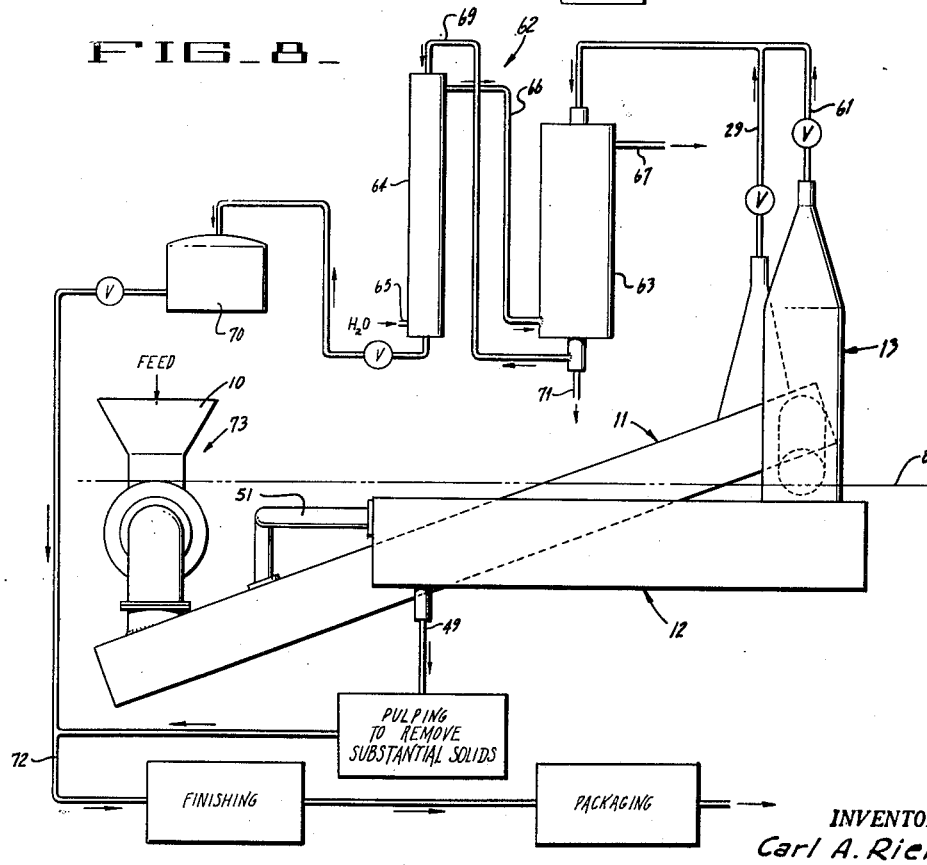
INVENTOR.
Carl A. Rietz
BY
ATTORNEYS United States Patent Office 3,036,921
Patented May 29, 1962

3,036,921
METHOD OF PROCESSING FOODSTUFFS
Carl A. Rietz, San Francisco, Calif., assignor to Rietz Manufacturing Co., Santa Rosa, Calif., a corporation of California
Filed Apr. 5, 1960, Ser. No. 20,084
10 Claims. (Cl. 99—105)

This invention relates generally to methods and apparatus for the processing of various juice-filled products of vegetable origin, including various succulent vegetables, fruits, and berries. This application is a continuation-in-part of my pending application, Serial No. 529,412, filed August 19, 1955, now abandoned.

In the food processing industry, it is frequently desirable to disintegrate juice-filled products to form a hydrous pulp or slurry, with heat exchange to a predetermined temperature level, prior to further processing (e.g. canning). Frequently the time required for such processing is an important factor, due to the degenerative oxidation process and/or enzymatic deterioration. As is well known to the food technologist and processor, oxidative degeneration proceeds very rapidly and is a prime contributor to the loss of flavor and color, as well as food values. Enzymatic activity (frequently initiated by the disintegrating action) may also effect changes in the material undergoing treatment, for example, causing staling or deterioration. In general, these degenerative effects are intensified by exposure of the disintegrated product to the atmosphere.

It is a general object of the present invention to provide a novel method and apparatus, suitable for the general type of processing operation outlined above, which greatly inhibits the effects attributable to the oxidative degeneration process.

It is a further object of the invention to provide a method and apparatus of the above character which makes possible effective control of enzymatic activity.

Another object is to provide a method and apparatus of the above character, employing a closed circulating system, in which atmosphere may be excluded from contact with the material undergoing treatment.

Another object is to provide a method and apparatus of such character in which the incoming product is immediately subjected to a heat exchange by immersion in recycled material, prior to disintegration.

Another object is to provide such a method and apparatus which makes possible the recovery of highly volatile flavor and aroma imparting ingredients, for return to the final product.

Another object of the invention is to provide a method and apparatus of the above character in which the treatment temperatures can be controlled in a novel and effective manner.

Additional objects and features of the invention will appear from the following description in which the preferred embodiments have been set forth in detail in conjunction with the accompanying drawings.

Referring to the drawings:

FIGURE 1 is a plan view illustrating equipment embodying the invention.

FIGURE 2 is a side elevational view of the equipment shown in FIGURE 1.

FIGURE 3 is an end view of the equipment illustrating a modification of the invention.

FIGURE 4 is a detail in section illustrating a portion of one of the conveying means.

FIGURE 5 is a detail partly in section illustrating the lower end of the conveying device shown in FIGURE 4.

FIGURE 6 is a detail partly in section illustrating that end of the conveying device 12 which receives disintegrated material.

FIGURE 7 is an end view of the equipment illustrating a further modification of the invention.

FIGURE 8 is a schematic view illustrating the operation of equipment in accordance with the invention.

The present invention is predicated on my discovery that succulent materials of vegetable origin, such as juice-filled vegetables, fruits, and berries, can be reduced to a hydrous pulp or slurry in a closed system, with heat exchange, in such fashion as to virtually eliminate the degenerative effects of oxidation and enzymatic deterioration. My process also permits a wide variety of succulent materials, such as pears, peaches, apricots, tomatoes, apples, blackberries, pineapples, grapes, citrus fruits and the like, to be processed in such manner that final products of enhanced aroma and flavor are obtained. It also provides a measure of control over the "activation" and "inactivation" of pectolytic enzymes, for example in processing to produce products in liquid form or such products in a gelatinous or "pectic" form.

Broadly stated, my invention involves the submergence of unbroken feed material in a juicy, pulpy fluid body of the same material, the fluid circulation and disintegration of the unbroken material to form additional juicy, pulpy fluid material, the return of such material to the fluid body, and the effecting of a heat exchange with respect to all materials undergoing treatment to maintain a predetermined critical temperature relationship. Specifically, I have found that processing at temperatures within the range from about 145° F. to 210° F. has the beneficial effect of creating a positive vapor pressure sufficient to exclude and remove oxidizing air. I have also observed that the activity of pectolytic enzymes is strongly effected by temperature. In general, the heat exchange in my process is such that the fluid body is at a temperature above about 155° F. to cause rapid de-activation of such enzymes without alteration of the pectic substances present in the materials undergoing treatment. However, processing at temperatures of the order of 145° F. to 160° F. may also be employed to activate such enzymes for certain processing (e.g. to produce fruit juices and other watery products).

My process also contemplates that flavor and aroma components, which normally escape from the system, can be expelled by vapor pressure generated within the system and condensed and recovered for return to the product, for example, prior to canning or other aseptic processing.

My process can be best understood after a description of the apparatus illustrated in the drawing. As shown in the embodiment illustrated in FIGURE 1, a hopper or vat 10 is provided which is dimensioned in accordance with capacity requirement. In general, this hopper should be of sufficient size to contain a substantial amount of the product supplied to the equipment. The top of the hopper may be open to receive feed material continuously, or it may be connected to suitable feed means enclosed in such a manner as to exclude the atmosphere. In conjunction with the hopper 10, I provide the conveying and heat exchange devices 11 and 12, and the disintegrator 13. For convenience, the device 11 is shown inclined to raise material removed from the lower end of the hopper to the raised inlet opening of the disintegrator 13. The device 12 can be substantially horizontal. The discharge from the disintegrator 13 delivers materials into the device 12, and as will be presently explained, a substantial portion of the material discharged from the device 12 is recycled to the hopper 10.

Suitable details for the device 11 are illustrated in FIGURES 4 and 5. The feed screw 14 can be constructed in the manner disclosed in Patent No. 2,610,033. Thus, a hollow shaft 16 extends longitudinally through the housing 17 and is provided with the hollow flights 18. The housing 17 may be U-shaped and is shown provided with jacket 19. The removable housing covers 20 and 21 facilitate cleaning. At the lower end of the device 11, or in other words, the left-hand end as viewed in FIGURE 2, the shaft extends from the vat 10 and is provided with an exterior journal 22. A suitable gland 23 is applied to the extremity of the shaft and is provided with pipe connections 24 and 25, one for making connection with a supply of steam and the other for removing condensate. That portion of the feed screw which extends through the lower portion of the vat 10 is exposed to receive material, whereas the remaining part of the feed screw extending laterally from the vat is completely enclosed within the housing 17.

The drive means for the shaft 16 schematically illustrated in FIGURES 1 and 2 consists of an electric motor 26 provided with suitable speed reducing gearing, and connected to the shaft 16 by the driving belt 27.

My system is preferably a closed system, consequently it is desirable to provide the device 11 with means to release or exhaust the vapor pressure being generated. Thus the upper end of the housing 17 can be provided with an upwardly extending hood 28 which is shown provided with the pipe connection 29. As will be presently explained, the pipe 29 is preferably connected to a low pressure condenser system which functions both to relieve the vapor pressure in the device 11, and also to recover flavor and aroma volatiles for return to the product.

The disintegrator 13 can be of the type disclosed in my Patent No. 2,325,426. Briefly, such a machine consists of a vertical rotor provided with disintegrating hammers and surrounded by a cylindrical shaped screen. The feed is delivered to space above the rotor and progresses down into the zone of operation of the rotating hammers. The impacted and disintegrated material, after passing through the screen, drops downwardly through a lower discharge opening. In the present instance, the inlet or feed opening of the disintegrator is connected by conduit 31 with the upper end of the housing 17, and the lower or discharge opening of the disintegrator discharges directly into the housing of the device 12.

Preferably the disintegrator 13 is similarly provided with an upward extending exhaust hood 60 having the pipe connections 61. The pipe 61 may similarly exhaust vapors to the low pressure condenser system for relief of vapor pressure, and essence recovery, in the manner hereinafter explained in detail.

In addition to discharging the disintegrated material into the device 12, the disintegrator can be provided with secondary discharge means 32 corresponding to the secondary discharge means 23 illustrated in FIGURES 1 and 2 of said Patent No. 2,325,426. As indicated, this secondary discharge means can be in the form of a feed screw driven by the separate motor 33 and provided with a suitable shrouding or casing. Material delivered by this secondary means is removed from the system, and as explained in said Patent No. 2,325,426, may be undesired fibrous material, etc. It should be understood that in some instances this secondary discharge is not required.

The device 12 can be constructed in the same general manner as device 11. As illustrated particularly in FIGURE 6, the feed screw 35 can consist of the hollow shaft 36 provided with the hollow flights 37, and extending within the housing 38. The housing is likewise shown provided with removable covers 39 and 41. Also, it is desirable to provide the jacketing 42.

The inlet end of the device 12 is provided with a gland 43 which has pipe connections 44 and 45 to admit steam and remove condensate respectively. Also, the shaft of this device is shown being driven by the electric motor 47, and the drive belt 48.

At the discharge end of the device 12, there is a pipe 49 by means of which finished material can be withdrawn from the system. In addition means is provided for returning (i.e. re-cycling) the bulk of the material back into the hopper 10. In FIGURES 1 and 2, this return means is a simple conduit 51 which makes connection with the hopper 10 at a level above the flights of the feed screw. In FIGURE 3, the return means consists of a suitable slurry or pulp pump 52 which has its inlet side connected to the housing of device 12, and its discharge side connected by pipe 53 to the hopper 10.

In many processing operations, the succulent product being treated is heated to a predetermined temperature level within a predetermined period of time. A substantial part of the heat input can be by virtue of steam introduced into the hollow flights of the devices 11 and 12. Additional steam can be introduced into the jackets of these devices, and for this purpose I have shown steam inlet pipes 56 and 57, and the condensate removal pipes 58 and 59. Where further heat input is desired, some steam may be sparged directly into the material undergoing treatment. Thus steam can be sparged into the material within the hopper 10, the material passing through the devices 11 and 12, and/or into the zone of disintegration of the disintegrating machine 13.

My process is best described by reference to the particular material undergoing processing. For example, in processing tomatoes to form such products as tomato paste, tomato puree, tomato ketchup and the like, the material introduced to the system should be heated to a carefully controlled temperature adapted to inactivate the enzymes, bacterial spores, and to kill bacteria. In general, operating temperatures for this purpose range from 175° F. to 210° F., with 185° F. being the optimum temperature. When the tomatoes are processed at these temperatures, the resulting product preserves the essential pectin characteristic of the pectin component, as necessary in a paste or puree type product. With other vegetable matter, the optimum temperature for inactivation of enzymes may be substantially lower. For example, in the processing of potatoes to produce pureed potatoes, inactivation occurs at around 165° F. In general, a temperature of at least 155° F. may be considered necessary for inactivation processing. In contrast, where the tomatoes are to be processed to produce liquid products such as tomato juice, processing temperatures ranging from 145° F. to 160° F. have been found to be satisfactory. Processing at such temperatures, although well above the thermal death point of bacteria and bacterial spores, results in pectolytic enzyme activation to produce a watery product ideally suited in taste and physical properties for use as commercial tomato juice (the tomato pectin in such product being preferably dissolved).

Assuming the processing of tomatoes or like products to produce a paste or puree of highest possible density and viscosity, clean fresh, unbroken tomatoes are first delivered to the hopper 10. The material is fed from the hopper longitudinally through the device 11 and delivered to the disintegrator 13. Disintegrated material then passes through the device 12 and a substantial part is returned to the hopper 10 with some being continuously removed from the system by way of pipe 49. During this processing, the material passing through the device 11 is heated a predetermined amount by a controlled introduction of steam into the hollow flights of this device, and into the enclosing jackets. The pulplike material discharged from the disintegrator 13 is similarly heated in its passage through the device 12, whereby a maximum temperature level is reached before the material is re-introduced to the hopper 10. Assuming continuous operation to arrive at equilibrium, the material discharging from the device 12 quickly attains the desired treatment temperature, which, for example, is of the order of 185° F. for tomatoes. If desired, the obtaining of equilibrium conditions can be accelerated by preheating all component parts for a period of 10 to 40 minutes prior to introduction of the product. In the case of canning or other aseptic processing, preheating has the additional advantage of sterilizing the equipment so that all of subsequent processing can be carried out at relatively low temperature (under 210° F.), to achieve aseptic, sterile delivery and packaging without the necessity of "retorting" at higher temperatures.

As previously mentioned, a substantial portion of the material from the outlet of device 12 is returned to the hopper 10, and the remainder withdrawn from the system. The hot pulp so re-introduced into the hopper 10 forms a fluid body that immerses the incoming product, whereby heat exchange takes place which immediately increases the temperature of the incoming tomatoes. In FIGURE 2, a typical level 9 has been indicated for the pulp in the hopper 10, whereby the tomatoes being fed to the hopper are immediately immersed for effective heat transfer. Thus the incoming tomatoes are immediately heated to an elevated temperature, which is desirable because it facilitates raising the temperature level of the material being processed to a desired value in a relatively short period of time. A further advantage gained by introducing the tomatoes directly into a mass of hot pulp is that treatment of the tomatoes does not commence until after they have been immersed in the pulp. This is desirable because if the skin of such products as tomatoes, pears, apples, etc. is broken to expose the flesh to air, enzymatic action tends to take place immediately, thus changing the amount of pectin present before effective processing. However, with my process the products introduced remain intact prior to immersion and active processing.

The feature described above, namely, the re-cycling of hot pulp whereby the incoming products are received in the hot fluid material, is further desirable in that simplified control is possible to maintain processing temperatures within the desired critical range, for a given amount of heat input. This control is carried out by adjusting the amount of pulp removed from the system, thereby adjusting the amount of material re-cycled. Such control is of particular advantage in the processing of minimum boiling point mixtures (e.g. azeotropic mixtures) of the type herein disclosed, where heating sufficient to raise the temperature of the mixture to its boiling point (e.g. about 212° F. in the present instance) is to be avoided.

In the treatment of materials like pears, apples, grapes, tomatoes, etc. which are highly susceptible to oxidation, it is desirable to exclude air from the material undergoing processing. As previously noted, this is accomplished in the present invention by maintenance of a throughout temperature in a closed system (i.e. closed to the atmosphere) which is in excess of about 145° F. In an essentially aqueous system, processing at such temperatures generates sufficient vapor pressure to displace and exclude air from the system, and thereby prevent or minimize oxidation of the processed material. As illustrated in FIGURE 8, the vapor phase generated in the system is preferably expelled or displaced at relatively low pressure to a low pressure condenser system 62, including the condensers 63 and 64. These condensers can be simple water cooled units adapted to be cooled in countercurrent fashion by water (e.g. 65–80° F.) introduced at 65, circulated through the line 66, and removed at 67. As will be understood, the vapors discharged from the devices 11, 13 (through the lines 29 and 61) are partially condensed in the unit 63, the uncondensed vapors passing through the line 69 being condensed in the unit 64 for collection in the receiver 70. Other condenser systems than the one illustrated, can, of course, be employed.

Recovery systems of the type illustrated in FIGURE 8 are of particular advantage in processing products such as apples, pears, grapes, pineapples, citrus fruits, etc., where recovery of flavor and aroma values is desirable.

The vapor phase of such products (which is believed to be derived at least in part from internal air—i.e. the so-called "air of constitution") is known to be rich in highly volatile aromatic oils and volatile esters normally associated with the flavor and aroma values. In my system, the water vapor associated with such vapor phase is substantially condensed in the first unit 63 so that the condensate withdrawn at 71 is found to be leaner in the more volatile constituents than the condensate from the unit 64. The condensate from the latter, containing the flavor and aroma imparting ingredients, is preferably stored in a receiver 70 for subsequent return through the line 72 to the product being discharged through the line 49. In accordance with a typical processing technique the essence condensates are returned to the product after it has been pulped to remove skins, seeds, cores, etc. but prior to the customary finishing operations. Such finishing operations may include mixing and blending of various batches of feed materials, plus additives such as preservatives, sweeteners, acidifiers, etc., prior to addition of the essence ingredients. In cases where centrifugation is substituted for pulping and finishing, the essence components may be re-introduced prior to packaging (e.g. canning). In all such processing, it is generally desirable that the equipment be operated out of the presence of air.

In many instances, it is desirable to employ a compression or force feeder, of the type generally illustrated at 73 in FIGURE 7, to insure maintenance of a desired liquid level in the hopper 10, consistent with various rates of circulation of the feed material. By way of illustration, reduced circulation rates through the devices 11, 12 and 13 have been found to be advantageous with green or under-ripe materials. Similarly, soft, over-ripe materials seem to require higher circulation rates.

In general, the compression feeder illustrated in FIGURE 7 comprises a feed screw 74, which may be operated at variable speeds depending upon the speed of operation of the feed screws 14 and 35 in the devices 11 and 12. The feed screw 74 can be constructed in the same general manner as the devices 11 and 12. Thus the screw 74 can comprise a hollow shaft 75 provided with hollow flights 76, and may be supported at one end by spaced apart external bearings 77 so as to be freely supported within the housing 78. The latter may include jacketing 79 to facilitate temperature maintenance within the feeder passage. The drive means of the shaft 75 may consist of an electric motor (not shown) provided with suitable speed reducing gearing, and connected to the shaft by the driving belt 81. Preferably the shaft of the feeder is operated at a speed sufficient to maintain a liquid level within the hopper 10 which is equal to or slightly below that obtained in the devices 11 and 12 (represented by the dotted line 82 in FIGURES 7 and 8).

In a typical operation, the apparatus disclosed in FIGURES 7 and 8 can be operated as follows. Assuming the processing of pears to make a pear puree, useful, for example, as baby food, the apparatus is preheated for service by filling all components (e.g. force feeder 73, and devices 11, 12 and 13) with hot water, and employing steam to maintain desired preheat temperatures. Preheating is continued for 20 to 30 minutes, with all drives in service, at which time the hot water is drained. Immediately clean, washed unbroken pears are fed to the hopper 10, and the system operated until such time as it becomes filled with an equilibrium mixture comprising a juicy pulpy mass of disintegrated pears. Thereafter fresh unbroken pears are immersed within the fluid body in the hopper for conveyance in the system by the force feeder 73 and the device 11. In the disintegrator 13 the substantially unbroken products are disintegrated to form additional pulpy mass which is returned by the device 12 and conduit 51 to the hopper. During this processing, steam is continuously introduced into the hollow flights of the devices 11 and 12 and into the jackets of these devices and the compression feeder 73. Steam pressures are controlled to obtain heat exchange to maintain the circulating pulpy mass at a desired predetermined temperature in excess of about 185° F. to de-activate the pectolytic enzymes without alteration of pectic substances within the circulating mass. Temperature control is also obtained by adjusting the amount of pulp removed from the system through the line 49, with consequent control of the amount re-cycled through the line 51. This amount of heating is effective to build up sufficient vapor pressure within the circulating mass to exclude extraneous air and thereby overcome a normal tendency of the air in the fruit to oxidize or "brown" the pulp. When equilibrium conditions have been achieved, the valves in the vapor lines 29 and 61 are open permitting the vapor phase to be forced under positive pressure through the low pressure condenser system 62. The condenser units 63 and 64 of the latter function to remove air and excess water vapor from the system and to effect recovery of highly volatile flavor and aroma imparting ingredients for return to the end product as through the line 72, just ahead of final packing. It may be noted that in operations of this type, involving essence recovery, it is desirable to return the throughput from the top of the device 12, as this seems to effect a greater recovery of the highly volatile essence ingredients. In the illustrated apparatus, this is accomplished by positioning the return line 51 above the center line of the device 12 (note FIGURES 2, 3 and 8).

The pear puree produced by the above processing was found to be much higher in aroma than commercially available pear purees, and was whiter. It also possessed an enhanced flavor. In addition, quantities of a refrigerated product, left exposed to the atmosphere for prolonged periods (e.g. more than a week) did not surface brown. When the product was emptied onto a flat surface, it tended to remain in a cone-like pile with practically no water line around the edge, demonstrating almost total pectin retention. Similar results are obtainable with other juice-filled products of similar character, such as apricots, peaches, apples and the like. As a result, the processing is particularly useful in the treatment of such fruits as grapes and similar fruits in the making of jelly, preserves, apple butter, etc., and in every case produces a product having enhanced flavor and aroma, as well as improved appearance and color.

Many variations are possible in the processing, and in the use of the apparatus herein disclosed. For example, it may be desirable to cool a material undergoing treatment, instead of heating it to an elevated temperature. Preliminary processing may also be employed with such thick skinned products as citrus fruits, to soften and re-remove the skin without breaking protective inner skins surrounding the pulp. In other processing, it may be desirable to pump the product derived from line 49 directly to a packing line, without intermediate processing, for example, as in processing carrots to produce a carrot puree. Many other variations will similarly occur to those in this art, in relation to specific products. Accordingly, it should be understood that the disclosures herein are intended as purely illustrative and not in any sense limiting.

I claim:

1. In a method of processing juicy products of vegetable origin, the steps of submerging unbroken products in a fluid body comprising part of a closed system, said fluid body being in the form of a juicy pulpy mass of the same product in disintegrated form, continuously conveying said juicy pulpy mass along with unbroken products to a zone of disintegration within said closed system, disintegrating said unbroken products in said zone in the presence of said juicy pulpy mass to form additional juicy pulpy mass, continuously returning the bulk of the resulting juicy pulpy mass from said disintegration zone to said fluid body while removing a portion of the same as an end product, and simultaneously subjecting said products and juicy pulpy mass to continuous heat exchange to maintain a desired equilibrium temperature at substantially all points within said closed circulating system.

2. A method as in claim 1 wherein said heat exchange is sufficient to maintain a desired equilibrium temperature within the range from about 145° to 210° F. to thereby form a positive vapor pressure system adapted to exclude air.

3. A method as in claim 2 wherein said heat exchange is adapted to maintain an equilibrium temperature within the range from about 145° to 160° F. to obtain activation of pectolytic enzymes present in the material undergoing treatment.

4. A process as in claim 2 wherein said heat exchange is adapted to maintain an equilibrium temperature within the range from about 155° to 210° F., to thereby effect inactivation of pectolytic enzymes present in the material undergoing treatment.

5. In a method of processing juicy products of vegetable origin, the steps of submerging unbroken products in a fluid body forming part of a closed circulating system, said fluid body comprising a juicy pulpy mass of the same product in disintegrated form, continuously conveying said juicy pulpy mass along with unbroken products to a zone of disintegration within said closed system, disintegrating said unbroken products in said zone in the presence of said mass to form additional juicy pulpy mass, subjecting said products and juicy pulpy mass derived therefrom to continuous heat exchange to maintain the same at a desired predetermined temperature in excess of about 145° F. but below about 210° F., whereby positive vapor pressure system is established adapted to exclude air, continuously removing a portion of said circulating juicy pulpy mass as an end product, and continuously removing and condensing portions of the vapor phase produced in said closed system as an intermediate product, and continuously returning the remainder of said circulating juicy pulpy mass to said fluid body.

6. A process as in claim 5 wherein said vapor phase is displaced by the positive pressure of said system into a relatively low pressure vapor condensing system, said system acting to condense and recover highly volatile flavor and aroma ingredients.

7. A process as in claim 6 wherein said flavor and aroma ingredients are mixed with said portion of the juicy pulpy mass removed as an end product, to form a final product of enhanced flavor and aroma.

8. In a method for the processing of juicy products of vegetable origin within a closed circulating system, submerging the raw product in unbroken form in a fluid body comprising a juicy pulpy mass of the same product in disintegrated form, conveying the unbroken product and a portion of said juicy pulpy mass away from said fluid body, disintegrating the removed unbroken product in the presence of the removed juicy pulpy mass to form additional juicy pulpy mass, continuously returning the major portion of the resultant juicy pulpy mass to said fluid body, and effecting a heat exchange with respect to the circulating material undergoing treatment sufficient to form a positive vapor pressure within the system adapted to exclude oxidizing air.

9. In a method of processing juicy products of vegetable origin within a closed circulating system, introducing the product in unbroken form into a fluid body comprising a juicy pulpy mass of the same material in disintegrated form, conveying said products along with the juicy pulpy mass to a zone of disintegration within said closed systems, disintegrating the same in said zone to form additional juicy pulpy mass, the juicy pulpy mass so formed comprising an azeotropic mixture having a minimum boiling point substantially equivalent to that of water, continuously returning the majority of said juicy pulpy mass from said zone of disintegration to said fluid body, and effecting a heat exchange with respect to said azeotropic mixture sufficient to form a positive vapor pressure system adapted to exclude air from said circulatory system but insufficient to raise said mixture to its boiling point.

10. A process as in claim 9 wherein said heat exchange is sufficient to maintain the temperature of said azeotropic mixture within the range from 145° F. to 210° F.

References Cited in the file of this patent

UNITED STATES PATENTS

| | | |
|---|---|---|
| 2,089,071 | Roberts | Aug. 3, 1937 |
| 2,092,729 | Eberts | Sept. 7, 1937 |
| 2,270,007 | McKinnis | Jan. 13, 1942 |
| 2,598,418 | Odom et al. | May 27, 1952 |